United States Patent
Deng et al.

(10) Patent No.: US 10,558,498 B2
(45) Date of Patent: Feb. 11, 2020

(54) METHOD FOR SCHEDULING DATA FLOW TASK AND APPARATUS

(71) Applicant: Huawei Technologies Co., Ltd., Shenzhen, Guangdong (CN)

(72) Inventors: Liqun Deng, Shenzhen (CN); Junhua Zhu, Hangzhou (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 291 days.

(21) Appl. No.: 15/598,696

(22) Filed: May 18, 2017

(65) Prior Publication Data
US 2017/0255496 A1    Sep. 7, 2017

Related U.S. Application Data

(63) Continuation of application No. PCT/CN2014/091539, filed on Nov. 19, 2014.

(51) Int. Cl.
*G06F 9/46* (2006.01)
*G06F 9/50* (2006.01)
*G06F 9/48* (2006.01)

(52) U.S. Cl.
CPC ......... *G06F 9/5027* (2013.01); *G06F 9/4881* (2013.01)

(58) Field of Classification Search
None
See application file for complete search history.

(56) References Cited

U.S. PATENT DOCUMENTS

| 6,912,610 B2 | 6/2005 | Spencer |
| 2002/0120664 A1* | 8/2002 | Horn ............... G06F 9/5038 718/107 |

FOREIGN PATENT DOCUMENTS

| CN | 102541640 A | 7/2012 |
| CN | 102609978 A | 7/2012 |
| CN | 102737126 A | 10/2012 |
| CN | 103488531 A | 1/2014 |
| CN | 103713949 A | 4/2014 |

(Continued)

OTHER PUBLICATIONS

Augonnet et al.; "StarPU: A Unified Platform for Task Scheduling on Heterogeneous Multicore Architectures"; Concurrency and Computation Practice and Experience; vol. 23; 2011; 12 pages.

(Continued)

*Primary Examiner* — Wissam Rashid
(74) *Attorney, Agent, or Firm* — Womble Bond Dickinson (US) LLP

(57) ABSTRACT

A method for scheduling a data flow task and an apparatus. The method includes: preprocessing a data flow task to obtain at least one subtask; classifying the subtask into a central processing unit (CPU) task group, a graphics processing unit (GPU) task group, or a to-be-determined task group; allocating the subtask to a working node; when the subtask belongs to the CPU task group, determining that a CPU executes the subtask; when the subtask belongs to the GPU task group, determining that a GPU executes the subtask; or when the subtask belongs to the to-be-determined task group, determining, according to costs of executing the subtask by a CPU and a GPU, a running platform (e.g., the CPU or the GPU) executes the subtask, where the cost includes duration of executing the subtask.

20 Claims, 8 Drawing Sheets

(56) References Cited

FOREIGN PATENT DOCUMENTS

WO 2012170185 A 12/2012

OTHER PUBLICATIONS

Rychly et al.; "Scheduling Decisions in Stream Processing on Heterogeneous Clusters"; Eighth International Conference on Complex, Intelligent and Software Intensive Systems; 2014; 6 pages.
Choi et al.; "An Efficient Scheduling Scheme Using Estimated Execution Time for Heterogeneous Computing System"; The Journal of Supercomputing, vol. 65, Issue 2; Aug. 2013; 17 pages.
Aniello et al.; "Adaptive Online Scheduling in Storm"; DEBS '13, Jun. 29-Jul. 2013; Arlington, Texas, USA; 12 pages.
Grewe et al.; "A Static Task Partitioning Approach for Heterogeneous Systems Using OpenCL"; International Conference on Compiler Construction; Compiler Construction 2011; 20 pages.
Song et al.; "A Scalable Framework for Heterogeneous GPU-Based Clusters"; SPAA '12; Pittsburgh, Pennsylvania, USA; Jun. 25-27, 2012; 10 pages.

* cited by examiner

METHOD FOR SCHEDULING DATA FLOW TASK AND APPARATUS

CROSS-REFERENCE TO RELATED APPLICATIONS

This application is a continuation of International Application No. PCT/CN2014/091539, filed on Nov. 19, 2014, the disclosure of which is hereby incorporated by reference in its entirety.

TECHNICAL FIELD

The present application relates to the field of information processing technologies, and specifically, to amethod for scheduling a data flow task and an apparatus.

BACKGROUND

A data flow, such as sensor data generated by a sensor source, ever-increasing log data, and a continuously updated securities trading record, is a common data form. Compared with a conventional database management system, data flow processing has two unique characteristics: (1) continuity, that is, data is continuously generated, and a corresponding data processing operation needs to be driven by data, to be continuously and repeatedly performed; (2) real-time performance, that is, a data processing delay needs to be short enough to meet specific delay requirements of various applications, and if data is not processed in a timely manner, input data may be blocked, and a processing result is further affected.

Considering a requirement of a data flow processing system on the real-time performance, a coprocessor or an accelerator is commonly used to accelerate processing of a data flow task, so as to improve system throughput. The accelerator may be a graphics processing unit (GPU), a field programmable gate array (FPGA), or the like.

Processing a data flow is executing a data flow task, and the data flow task may be divided into multiple subtasks. In a distributed heterogeneous system, each subtask may be separately executed by a central processing unit (CPU) and a GPU. However, resource configurations for all working nodes in the system may be different, and computing capabilities of the CPU and the GPU are also quite different. Therefore, the subtask needs to be appropriately scheduled to meet a delay requirement and maximize system throughput.

An existing method for scheduling a data flow task may be adjusted according to a change of the subtask to dynamically calculate overheads of executing the subtask separately by the CPU and the GPU, thereby selecting a platform with a less overhead to execute the subtask. However, in the method for scheduling a data flow task, overheads of executing each subtask by the CPU and the GPU need to be calculated, and consequently, a scheduling delay is relatively long.

SUMMARY

Embodiments of the present disclosure provide a method for scheduling a data flow task and an apparatus, so as to reduce a delay of scheduling a data flow task.

According to a first aspect, a method for scheduling a data flow task is provided, where a distributed heterogeneous system to which the method is applied includes at least one working node, and the method includes: preprocessing the data flow task to obtain at least one subtask; classifying a first subtask in the at least one subtask into a central processing unit CPU task group, a graphics processing unit GPU task group, or a to-be-determined task group; allocating the first subtask to a first working node in the at least one working node according to the task group to which the first subtask belongs and a resource status of the at least one working node; and when the first subtask belongs to the CPU task group, determining that a CPU corresponding to the first working node executes the first subtask; when the first subtask belongs to the GPU task group, determining that a GPU corresponding to the first working node executes the first subtask; or when the first subtask belongs to the to-be-determined task group, determining, according to costs of executing the first subtask by a CPU and a GPU, that the CPU or the GPU corresponding to the first working node executes the first subtask, where the cost includes duration of executing the subtask.

With reference to the first aspect, in a first possible implementation manner of the first aspect, the classifying a first subtask in the at least one subtask into a central processing unit CPU task group, a graphics processing unit GPU task group, or a to-be-determined task group includes: classifying the first subtask into the CPU task group when the first subtask includes indication information, and the indication information indicates that the first subtask is executed by the CPU; classifying the first subtask into the GPU task group when the first subtask includes indication information, and the indication information indicates that the first subtask is executed by the GPU; or when the first subtask does not include indication information, estimating first duration of executing the first subtask by the CPU and second duration of executing the first subtask by the GPU, and classifying the first subtask into the CPU task group, the GPU task group, or the to-be-determined task group according to the first duration and the second duration.

With reference to the first possible implementation manner of the first aspect, in a second possible implementation manner of the first aspect, the classifying the first subtask into the CPU task group, the GPU task group, or the to-be-determined task group according to the first duration and the second duration includes: classifying the first subtask into the CPU task group if a ratio of the first duration to the second duration is less than a first preset threshold; classifying the first subtask into the GPU task group if a ratio of the first duration to the second duration is greater than a second preset threshold; or classifying the first subtask into the to-be-determined task group if a ratio of the first duration to the second duration is not less than the first preset threshold, or is not greater than the second preset threshold.

With reference to any one of the first aspect or the first and the second possible implementation manners of the first aspect, in a third possible implementation manner of the first aspect, the allocating the first subtask to a first working node in the at least one working node according to the task group to which the first subtask belongs and a resource status of the at least one working node includes: determining a first working node group that is in the at least one working node and that includes an available CPU resource, and a second working node group that is in the at least one working node and that includes an available GPU resource, where nodes in the first working node group are sorted according to a remainder of the available CPU resource, and nodes in the second working node group are sorted according to a remainder of the available GPU resource; and according to the task group to which the first subtask belongs, allocating the first subtask to the first working node in the first working node group according to sorting of the first working node group, or allocating the first subtask to the first working node in the second working node group according to sorting of the second working node group.

With reference to any one of the first aspect or the first to the third possible implementation manners of the first aspect, in a fourth possible implementation manner of the first aspect, the method further includes: recording execution log information of the first subtask into a performance database, where the execution log information includes a data volume of the first subtask, required waiting duration before the first subtask is executed, and a running platform and running duration of the first subtask, and the running platform is the CPU or the GPU.

With reference to the fourth possible implementation manner of the first aspect, in a fifth possible implementation manner of the first aspect, the method further includes: querying the performance database, and calculating first average duration of executing subtasks by the CPU corresponding to the first working node and second average duration of executing the subtasks by the GPU corresponding to the first working node; and adjusting, according to the first average duration and the second average duration, a quantity of subtasks in the CPU task group on the first working node, or a quantity of subtasks in the GPU task group on the first working node.

With reference to the fifth possible implementation manner of the first aspect, in a sixth possible implementation manner of the first aspect, the adjusting, according to the first average duration and the second average duration, a quantity of subtasks in the CPU task group on the first working node, or a quantity of subtasks in the GPU task group on the first working node includes: if the first average duration is greater than the second average duration, allocating first M subtasks that are in the to-be-determined task group on the first working node and that have greatest acceleration ratios to the GPU task group on the first working node, where the acceleration ratio is a ratio of a time of executing a subtask by the CPU to a time of executing the subtask by the GPU, or allocating first N subtasks that are in the CPU task group on the first working node and that have greatest acceleration ratios to the to-be-determined task group on the first working node, where M and N are positive integers; or if the first average delay is less than the second average delay, allocating first M subtasks that are in the to-be-determined task group on the first working node and that have smallest acceleration ratios to the CPU task group on the first working node, or allocating first N subtasks that are in the GPU task group on the first working node and that have smallest acceleration ratios to the to-be-determined task group on the first working node.

According to a second aspect, an apparatus is provided, where a distributed heterogeneous system to which the apparatus is applied includes at least one working node, and the apparatus includes: a preprocessing unit, configured to preprocess a data flow task to obtain at least one subtask; a classification unit, configured to classify a first subtask in the at least one subtask into a central processing unit CPU task group, a graphics processing unit GPU task group, or a to-be-determined task group; an allocation unit, configured to allocate the first subtask to a first working node in the at least one working node according to the task group to which the first subtask belongs and a resource status of the at least one working node; and a determining unit, configured to: when the first subtask belongs to the CPU task group, determine that a CPU corresponding to the first working node executes the first subtask; when the first subtask belongs to the GPU task group, determine that a GPU corresponding to the first working node executes the first subtask; or when the first subtask belongs to the to-be-determined task group, determine, according to costs of executing the first subtask by a CPU and a GPU, that the CPU or the GPU corresponding to the first working node executes the first subtask, where the cost includes duration of executing the subtask.

With reference to the second aspect, in a first possible implementation manner of the second aspect, the classification unit is specifically configured to: classify the first subtask into the CPU task group when the first subtask includes indication information, and the indication information indicates that the first subtask is executed by the CPU; classify the first subtask into the GPU task group when the first subtask includes indication information, and the indication information indicates that the first subtask is executed by the GPU; or when the first subtask does not include indication information, estimate first duration of executing the first subtask by the CPU and second duration of executing the first subtask by the GPU, and classify the first subtask into the CPU task group, the GPU task group, or the to-be-determined task group according to the first duration and the second duration.

With reference to the first possible implementation manner of the second aspect, in a second possible implementation manner of the second aspect, the classification unit is specifically configured to: classify the first subtask into the CPU task group if a ratio of the first duration to the second duration is less than a first preset threshold; classify the first subtask into the GPU task group if a ratio of the first duration to the second duration is greater than a second preset threshold; or classify the first subtask into the to-be-determined task group if a ratio of the first duration to the second duration is not less than the first preset threshold, or is not greater than the second preset threshold.

With reference to any one of the second aspect or the first and the second possible implementation manners of the second aspect, in a third possible implementation manner of the second aspect, the allocation unit is specifically configured to: determine a first working node group that is in the at least one working node and that includes an available CPU resource, and a second working node group that is in the at least one working node and that includes an available GPU resource, where nodes in the first working node group are sorted according to a remainder of the available CPU resource, and nodes in the second working node group are sorted according to a remainder of the available GPU resource; and according to the task group to which the first subtask belongs, allocate the first subtask to the first working node in the first working node group according to sorting of the first working node group, or allocate the first subtask to the first working node in the second working node group according to sorting of the second working node group.

With reference to any one of the second aspect or the first to the third possible implementation manners of the second aspect, in a fourth possible implementation manner of the second aspect, the apparatus further includes: a recording unit, configured to record execution log information of the first subtask into a performance database, where the execution log information includes a data volume of the first subtask, required waiting duration before the first subtask is executed, and a running platform and running duration of the first subtask, and the running platform is the CPU or the GPU.

With reference to the fourth possible implementation manner of the second aspect, in a fifth possible implementation manner of the second aspect, the apparatus further includes: a query unit, configured to: query the performance database, and calculate first average duration of executing subtasks by the CPU corresponding to the first working node and second average duration of executing the subtasks by the GPU corresponding to the first working node; and an adjustment unit, configured to adjust, according to the first average duration and the second average duration, a quantity of subtasks in the CPU task group on the first working node, or a quantity of subtasks in the GPU task group on the first working node.

With reference to the fifth possible implementation manner of the second aspect, in a sixth possible implementation manner of the second aspect, the adjustment unit is specifically configured to: if the first average duration is greater than the second average duration, allocate first M subtasks that are in the to-be-determined task group on the first working node and that have greatest acceleration ratios to the GPU task group on the first working node, where the acceleration ratio is a ratio of a time of executing a subtask by the CPU to a time of executing the subtask by the GPU, or allocate first N subtasks that are in the CPU task group on the first working node and that have greatest acceleration ratios to the to-be-determined task group on the first working node, where M and N are positive integers; or if the first average delay is less than the second average delay, allocate first M subtasks that are in the to-be-determined task group on the first working node and that have smallest acceleration ratios to the CPU task group on the first working node, or allocate first N subtasks that are in the GPU task group on the first working node and that have smallest acceleration ratios to the to-be-determined task group on the first working node.

In the embodiments of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
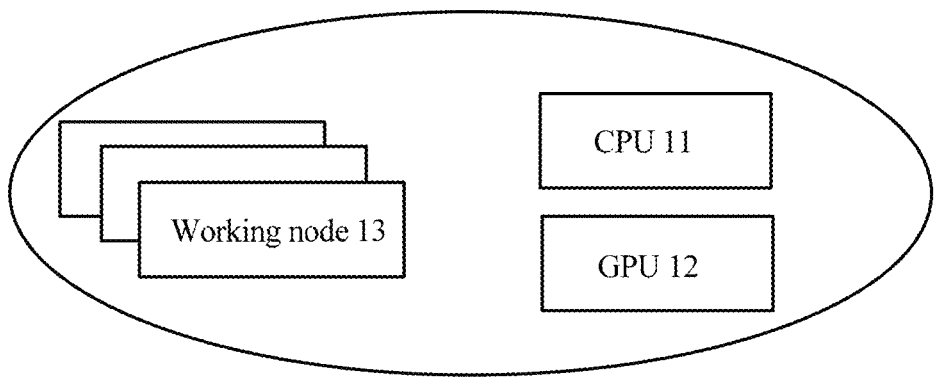
FIG. 1 is a schematic block diagram of a distributed heterogeneous system to which the present disclosure is applicable.

FIG. 1 is a schematic block diagram of a distributed heterogeneous system to which the present disclosure is applicable. A data flow task is preprocessed to obtain at least one subtask. The distributed heterogeneous system includes a CPU 11, a GPU 12, and at least one working node 13. The CPU 11 and the GPU 12 are execution platforms for executing each subtask.

It should be understood that only one CPU 11 and one GPU 12 are shown in FIG. 1. For the distributed heterogeneous system, there may be multiple CPUs 11 and GPUs 12. The at least one working node 13 shares a CPU resource and a GPU resource included in the distributed heterogeneous system. The subtask may be allocated to the working node 13, and then the subtask is scheduled to the CPU 11 or the GPU 12 corresponding to the working node 13 for execution. Different working nodes may be corresponding to a same CPU 11 or GPU 12, or may be corresponding to different CPUs 11 or GPUs 12, and this embodiment of the present disclosure is not limited thereto.

Figure 2:
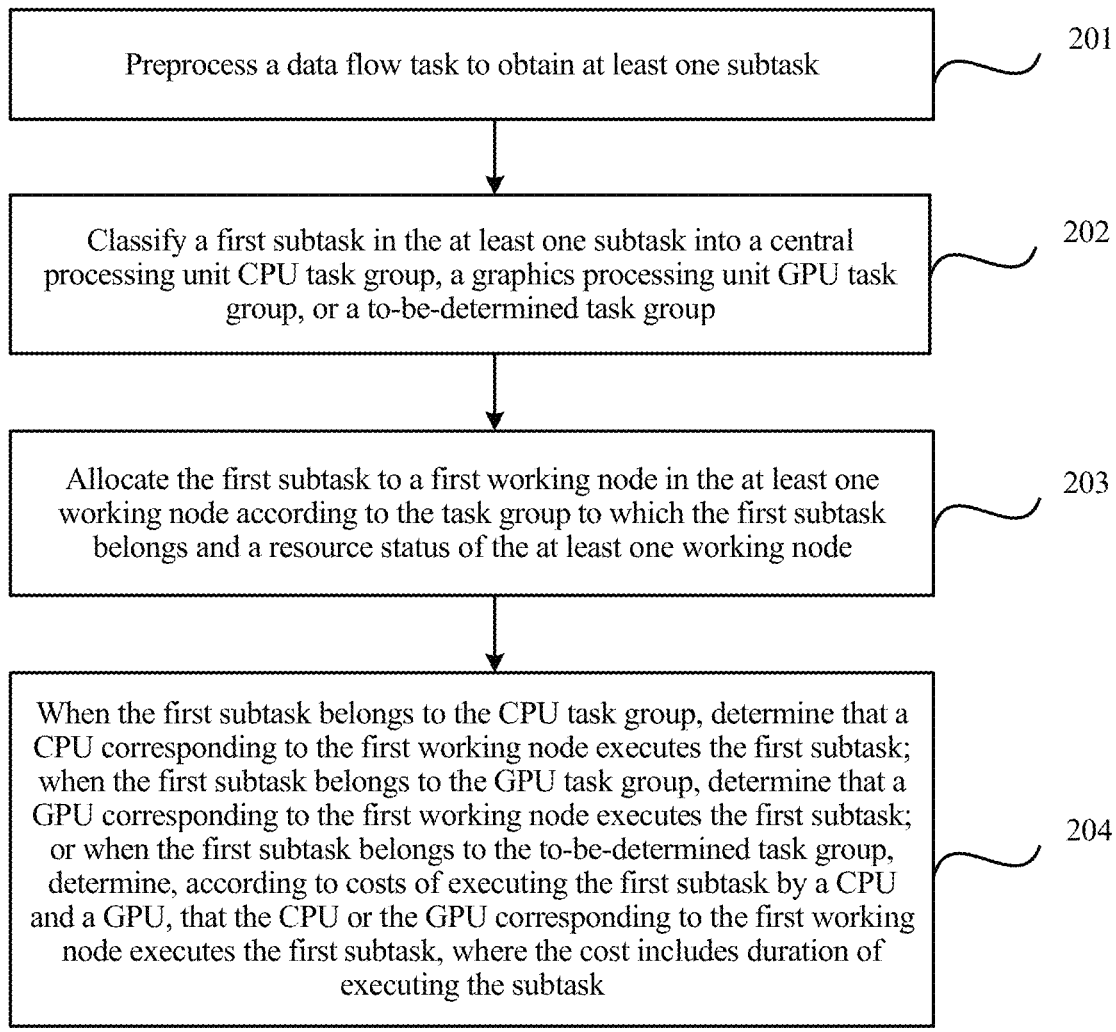
FIG. 2 is a schematic flowchart of a method for scheduling a data flow task according to an embodiment of the present disclosure.

FIG. 2 is a schematic flowchart of a method for scheduling a data flow task according to an embodiment of the present disclosure. The method 200 may be executed by a working node or any apparatus in FIG. 8 to FIG. 10. A distributed heterogeneous system to which the method 200 is applied includes at least one working node, and the method 200 includes:

201. Preprocess the data flow task to obtain at least one subtask.

202. Classify a first subtask in the at least one subtask into a central processing unit CPU task group, a graphics processing unit GPU task group, or a to-be-determined task group.

203. Allocate the first subtask to a first working node in the at least one working node according to the task group to which the first subtask belongs and a resource status of the at least one working node.

204. When the first subtask belongs to the CPU task group, determine that a CPU corresponding to the first working node executes the first subtask; when the first subtask belongs to the GPU task group, determine that a GPU corresponding to the first working node executes the first subtask; or when the first subtask belongs to the to-be-determined task group, determine, according to costs of executing the first subtask by a CPU and a GPU, that the CPU or the GPU corresponding to the first working node executes the first subtask, where the cost includes duration of executing the subtask.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

It should be understood that a process of processing a data flow may be executing a data flow task. A data volume of the data flow is relatively large, and therefore the data flow may be preprocessed to obtain multiple subtasks. The multiple subtasks may form one data flow task. Before the data flow task is processed, a data flow task request sent by user equipment may be received. The data flow task request is used to instruct to preprocess the data flow task.

Optionally, in an embodiment, preprocessing the data flow task may include a processing process such as statement parsing, semantic analysis, query tree optimization, and subtask generation. A process included in the preprocessing may be an existing common method, and the method used in the preprocessing process is not limited in this embodiment of the present disclosure.

Each subtask in the generated at least one subtask may execute a specific operation. For example, a subtask may be corresponding to a filter operation, a subtask may be corresponding to a sorting operation, and a subtask may be corresponding to an aggregation operation. The multiple subtasks may be mutually connected according to a dependency of data in the multiple subtasks, to form an execution plan data structure such as an execution tree or a directed acyclic graph (DAG).

It should be understood that the first subtask is any subtask in the at least one subtask. In this embodiment of the present disclosure, only the method for scheduling the first subtask is described, and the method in this embodiment of the present disclosure may be used for scheduling each subtask. The first working node is any working node in the at least one working node included in the distributed heterogeneous system. Each subtask needs to be allocated to a working node, so as to be executed by a CPU or a GPU corresponding to the working node.

The at least one subtask of the data flow task may be classified into three categories of task groups, and the three categories of task groups may be a CPU task group, a GPU task group, and a to-be-determined task group. A subtask in the CPU task group may be executed by the CPU, a subtask in the GPU task group may be executed by the GPU, and a subtask in the to-be-determined task group may be executed by the CPU or the GPU. A platform for executing the subtask in the to-be-determined task group may be dynamically adjusted such that execution costs are relatively low.

Optionally, in another embodiment, when a subtask in a working node is scheduled to a GPU for execution, a GPU kernel library corresponding to the working node is started to perform an operation on the subtask. The GPU kernel library saves GPU function implementation corresponding to the operation on the subtask.

Each subtask may be any category of the three categories of task groups. When a subtask is triggered for execution after being allocated to a working node, the subtask may be scheduled according to a task group to which the subtask belongs.

Figure 3:
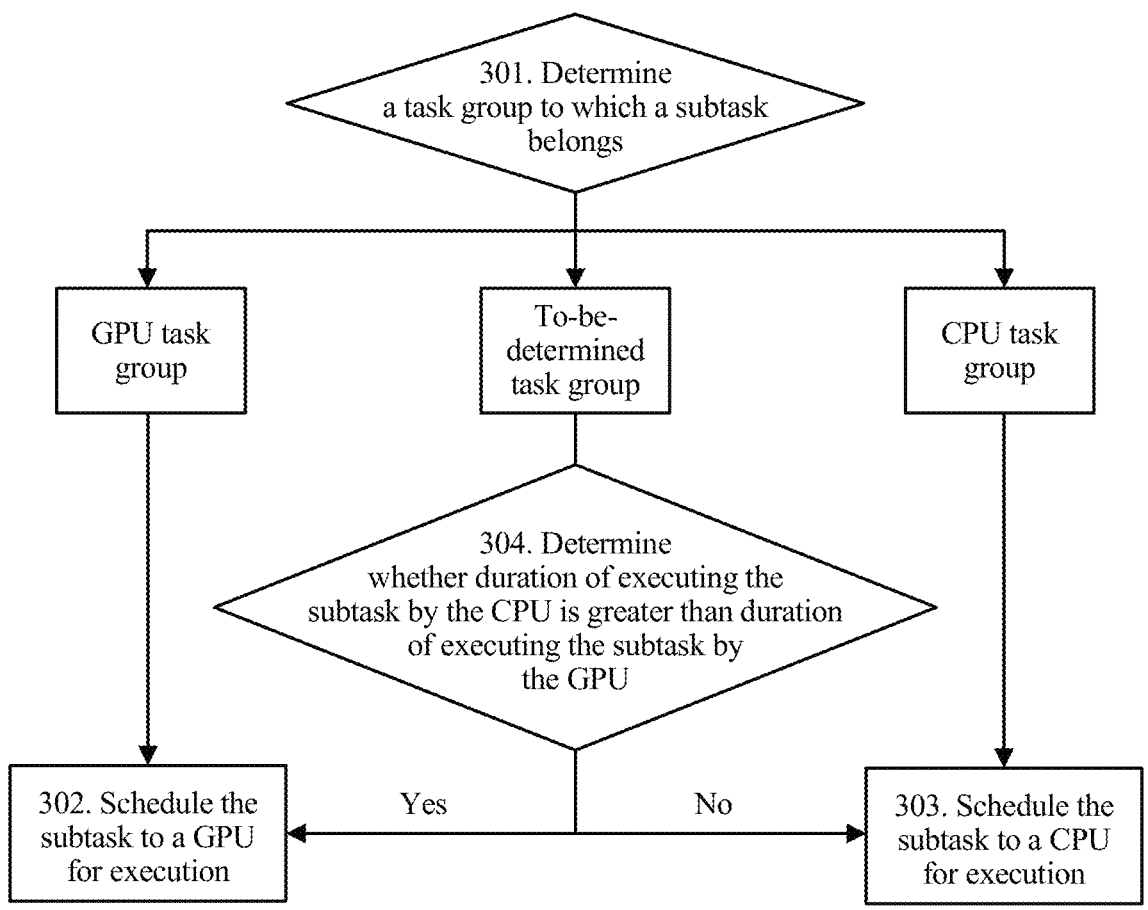
FIG. 3 is a schematic flowchart of a process of scheduling a subtask according to an embodiment of the present disclosure.

With reference to FIG. 3, the following describes in detail a method for scheduling at least one subtask to a CPU or a GPU for execution.

FIG. 3 is a schematic flowchart of a process of scheduling a subtask according to an embodiment of the present disclosure. The process may be executed by a working node or any apparatus in FIG. 8 to FIG. 10. Specifically, this process includes:

301. Determine a task group to which a subtask belongs.
If the subtask belongs to a GPU task group, perform 302; if the subtask belongs to a CPU task group, perform 303; or if the subtask belongs to a to-be-determined task group, perform 304.

302. Schedule the subtask to a GPU for execution.

303. Schedule the subtask to a CPU for execution.

304. Determine whether duration of executing the subtask by the CPU is greater than duration of executing the subtask by the GPU.

In 304, if the duration of executing the subtask by the CPU is greater than the duration of executing the subtask by the GPU, perform 302; or if the duration of executing the subtask by the CPU is not greater than the duration of executing the subtask by the GPU, perform 303.

Specifically, if the subtask belongs to the CPU task group, the subtask is scheduled to the CPU corresponding to the working node at which the subtask is located, to be executed; if the subtask belongs to the GPU task group, the subtask is scheduled to the GPU corresponding to the working node at which the subtask is located, to be executed; or if the subtask belongs to the to-be-determined task group, according to costs of executing the subtask by the CPU and the GPU, the subtask is scheduled to the CPU or the GPU corresponding to the working node at which the subtask is located, to be executed. The cost of executing the subtask may be obtained by means of estimation.

It should be understood that if the cost of executing the subtask by the CPU is lower, the subtask is executed by the CPU; or if the cost of executing the subtask by the GPU is lower, the subtask is executed by the GPU. The cost may include duration of executing the subtask. The duration of executing the subtask may include a required waiting time before the subtask is executed and a running time of the subtask. Optionally, in another embodiment, the cost may also include an overhead of executing the subtask, such as an occupied resource.

It should be further understood that if the costs of executing the subtask by the CPU and the GPU are the same, the subtask may be executed by the CPU, or may be executed by the GPU.

Figure 4:
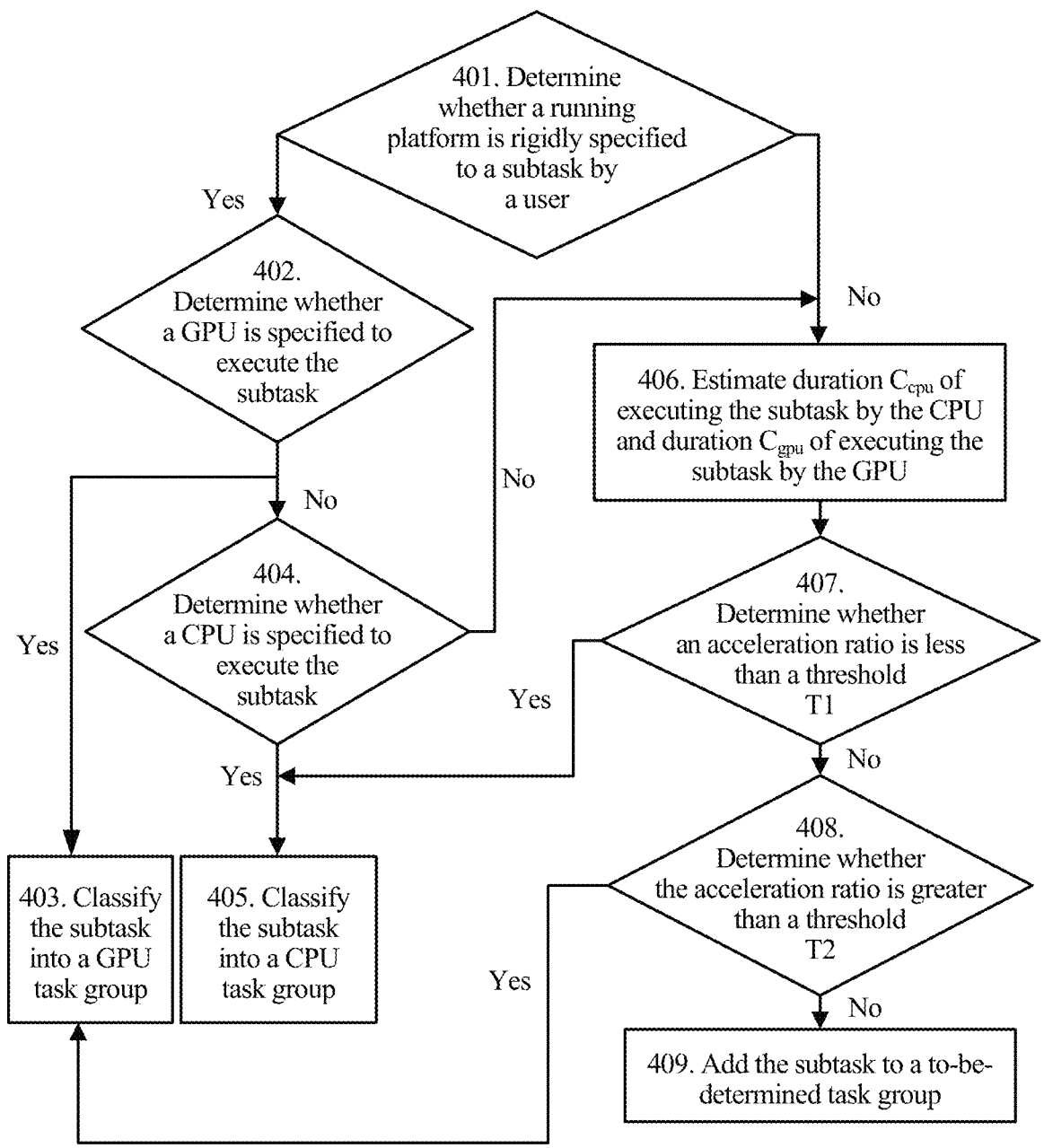
FIG. 4 is a schematic flowchart of a process of classifying a subtask according to an embodiment of the present disclosure.

FIG. 4 is a schematic flowchart of a process of classifying a subtask according to an embodiment of the present disclosure. The process may be executed by a working node or any apparatus in FIG. 8 to FIG. 10. Optionally, in another embodiment, in 202, when the first subtask includes indication information, and the indication information indicates that the first subtask is executed by the CPU, the first subtask is allocated to the CPU task group; when the first subtask includes indication information, and the indication information indicates that the first subtask is executed by the GPU, the first subtask is allocated to the GPU task group; or when the first subtask does not include indication information, first duration of executing the first subtask by the CPU and second duration of executing the first subtask by the GPU are estimated, and the first subtask is classified into the CPU task group, the GPU task group, or the to-be-determined task group according to the first duration and the second duration.

Specifically, the process of classifying a subtask may be:

401. Determine whether a running platform is rigidly specified to the subtask by a user.

In 401, if the running platform is rigidly specified to the subtask by a user, perform 402.

402. Determine whether a GPU is specified to execute the subtask.

In 402, if the GPU is specified to execute the subtask, perform 403.

403. Classify the subtask into the GPU task group.

In 402, if the GPU is not specified to execute the subtask, perform 404.

404. Determine whether a CPU is specified to execute the subtask.

In 404, if the CPU is specified to execute the subtask, perform 405.

405. Classify the subtask into the CPU task group.

In 404, if the CPU is not specified to execute the subtask; or in 401, if the running platform is not rigidly specified to the subtask by a user, perform 406.

406. Estimate duration $C_{cpu}$ of executing the subtask by the CPU and duration $C_{gpu}$ of executing the subtask by the GPU.

A ratio of the $C_{cpu}$ to the $C_{gpu}$ is recorded as an acceleration ratio.

407. Determine whether an acceleration ratio is less than a threshold T1.

In 407, if the acceleration ratio is less than the threshold T1, perform 405. In 407, if the acceleration ratio is not less than the threshold T1, perform 408. The threshold T1 is a first preset threshold, and T1 is a natural number greater than zero.

408. Determine whether the acceleration ratio is greater than a threshold T2.

In 408, if the acceleration ratio is greater than the threshold T2, perform 403; or if the acceleration ratio is not greater than the threshold T2, perform 409. The threshold T2 is a second preset threshold, and T2 is a natural number greater than zero.

409. Add the subtask to the to-be-determined task group.

Specifically, the process of classifying the first subtask may be determined based on two factors: a static characteristic and a cost of executing the first subtask, and the former has a higher priority. The indication information is used to indicate whether the subtask is executed by the CPU or is executed by the GPU. Optionally, in another embodiment, the indication information may include the static characteristic.

If the subtask includes the static characteristic, grouping is preferentially performed according to an indication of the static characteristic. The static characteristic may include: a rigid specification on each subtask by a user in a program or file configuration, or through another means, a user code semantic characteristic, and the like. For example, for a filter operation subtask, the user specifies that this type of operation is scheduled to the CPU for execution, and the specification may be implemented using @CPU in code. In this case, the subtask is classified into the CPU task group.

Optionally, in another embodiment, in 202, when the first subtask does not include indication information, first duration of executing the first subtask by the CPU and second duration of executing the first subtask by the GPU are estimated, and the first subtask is allocated to the CPU task group, the GPU task group, or the to-be-determined task group according to the first duration and the second duration.

Optionally, in another embodiment, if a radio of the first duration to the second duration is less than a first preset threshold, the first subtask is allocated to the CPU task group; if a radio of the first duration to the second duration is greater than a second preset threshold, the first subtask is allocated to the GPU task group; or if a radio of the first duration to the second duration is not less than the first preset threshold or is not greater than the second preset threshold, the first subtask is allocated to the to-be-determined task group.

Specifically, if the first subtask does not include the static characteristic, the first subtask is classified according to a cost of executing the first subtask. In 202, a cost calculation parameter of the first subtask may be obtained, so as to approximately estimate duration of executing the first subtask separately by the CPU and the GPU. A ratio of duration of executing the subtask by the CPU to duration of executing the subtask by the GPU is recorded as an acceleration ratio. If the acceleration ratio of the first subtask is greater than the first preset threshold, it indicates that it is better to execute the first subtask by the GPU, and the first subtask is classified into the GPU task group; if the acceleration ratio of the first subtask is less than the second preset threshold, it indicates that it is better to execute the first subtask by the CPU, and the first subtask is classified into the CPU task group; or if the acceleration ratio of the first subtask is not greater than the first preset threshold or is not less than the second preset threshold, it indicates that there is no obvious difference to execute the first subtask by the CPU and the GPU, and the first subtask is classified into the to-be-determined task group. An execution platform is dynamically determined for the subtask in the to-be-determined task group according to an actual running status.

It should be understood that the first preset threshold may represent a degree to which the first subtask being executed by the GPU is better than being executed by the CPU. The first preset threshold may be preset. The setting of the first preset threshold may be changed based on experience and an environment demand. Similarly, the second preset threshold may represent a degree to which the first subtask being executed by the CPU is better than being executed by the GPU. The second preset threshold may be preset. The setting of the second preset threshold may be changed based on experience and an environment demand.

Optionally, in another embodiment, in 203, a first working node group that is in the at least one working node and that includes an available CPU resource, and a second working node group that is in the at least one working node and that includes an available GPU resource are determined. Nodes in the first working node group may be sorted according to a remainder of the available CPU resource; and nodes in the second working node group may be sorted according to a remainder of the available GPU resource. According to the task group to which the first subtask belongs, the first subtask is allocated to the first working node in the first working node group according to sorting of the first working node group; or the first subtask is allocated to the first working node in the second working node group according to sorting of the second working node group.

Specifically, in the heterogeneous system, a computing resource is mainly a CPU, that is, the CPU computing resource is in the majority whereas a GPU resource is in the minority. When a subtask is allocated, a scarce resource allocated to each subtask is first considered. Therefore, in this embodiment of the present disclosure, scheduling may be performed according to a sequence in which the GPU task group is first allocated, then the to-be-determined task group, and finally the CPU task group.

Optionally, in an embodiment, in this embodiment of the present disclosure, statuses of the available CPU resource and the available GPU resource may be queried from a CPU/GPU resource management module. According to a query result, the first working node group having the available CPU resource and the second working node group having the available GPU resource may be determined. The CPU/GPU resource management module records configuration statuses of CPU and GPU resources and usage statuses of the CPU and GPU resources on each working node.

Nodes in the second working node group are sorted in descending order according to an average remainder of available GPU resources of the nodes, and are recorded as GPU Nodes. Nodes in the first working node group are sorted in descending order according to a quantity of available CPU resources of the nodes, and are recorded as CPU Nodes. The quantity of the available CPU resources may be indicated using a quantity of CPU interfaces (CPU Slot). For the working nodes in the GPU Nodes, a digit or another identifier may be used to indicate a sequence of allocating each working node.

Optionally, in another embodiment, in 203, a subtask in the GPU task group may be sequentially allocated to a working node in the GPU node group in a polling manner. That is, according to the sorting of the GPU node group, a working node in the front ranking is first selected. For example, an allocation sequence may be determined according to an identifier marked on each working node. After one subtask is allocated to a working node, a corresponding GPU resource is deducted from the current working node. Allocation of a next subtask starts from a next working node in a next GPU Nodes.

If the first subtask requires more GPU resources than an available GPU resource on each working node in the current GPU Nodes, a working node that is in all working nodes in the GPU Nodes and that runs a largest quantity of tasks in the to-be-determined task group is selected for allocation.

Optionally, in another embodiment, when subtasks in the to-be-determined task group are allocated, the subtasks in the to-be-determined task group may be allocated to at least one second working node in descending order of priorities until all subtasks in the to-be-determined task group are allocated or there is no matched available GPU resource for allocation. Remaining unallocated subtasks are allocated to working nodes in the CPU Nodes in a polling manner. The polling allocation manner may be the same as the polling method in which the subtask in the GPU task group is allocated, and to avoid repetition, details are not described herein again.

Optionally, in another embodiment, the subtasks in the CPU task group may be allocated to working nodes in the GPU Nodes in a polling manner. The polling allocation manner may be the same as the polling method in which the subtask in the GPU task group is allocated, and to avoid repetition, details are not described herein again.

Figure 5:
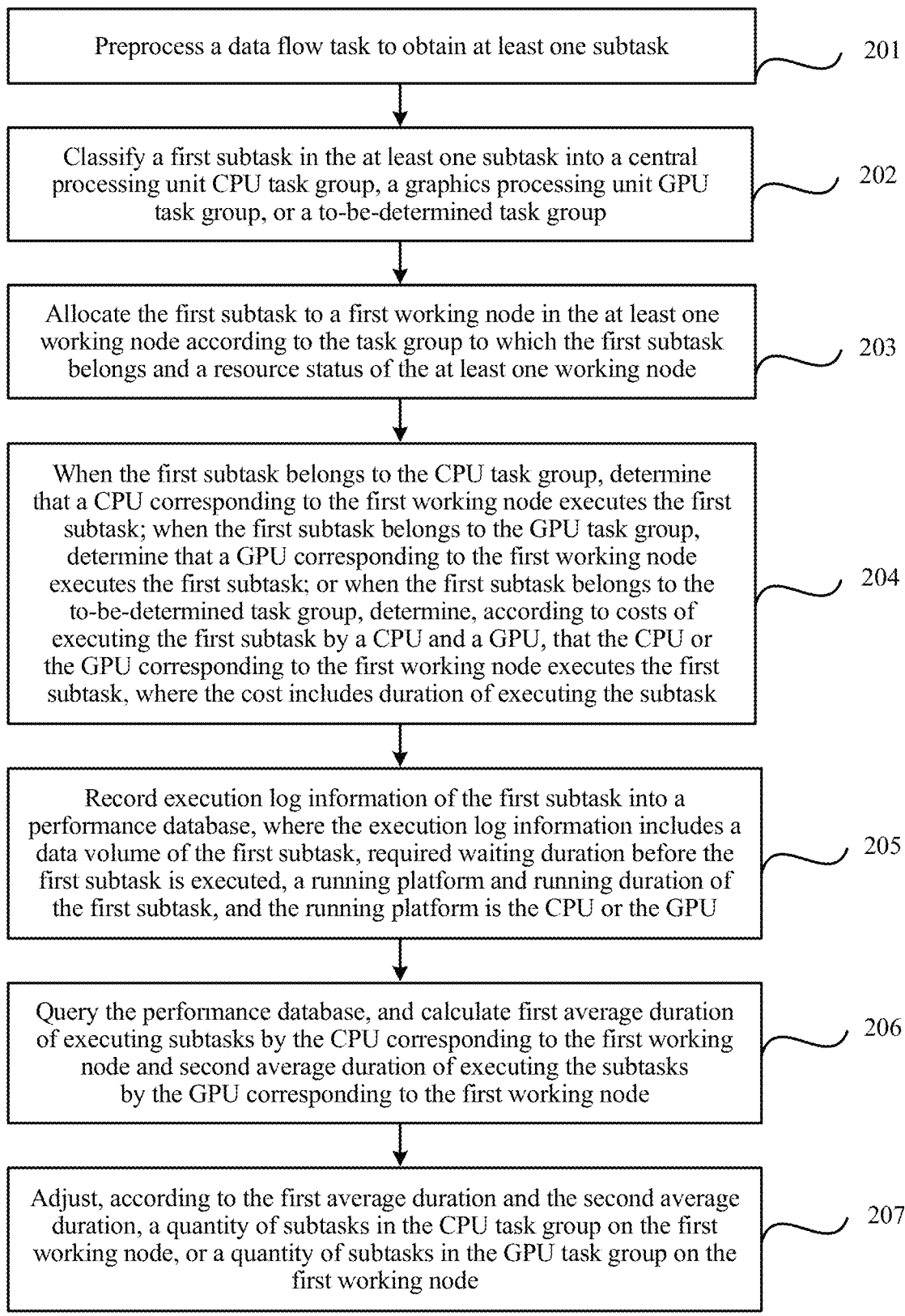
FIG. 5 is a schematic flowchart of a method for scheduling a data flow task according to another embodiment of the present disclosure.

FIG. 5 is a schematic flowchart of a method for scheduling a data flow task according to another embodiment of the present disclosure. The method may be executed by a working node or any apparatus in FIG. 8 to FIG. 10. The method 200 may further include:

205. Record execution log information of the first subtask into a performance database, where the execution log information includes a data volume of the first subtask, required waiting duration before the first subtask is executed, and a running platform and running duration of the first subtask, and the running platform is the CPU or the GPU.

206. Query the performance database, and calculate first average duration of executing subtasks by the CPU corresponding to the first working node and second average duration of executing subtasks by the GPU corresponding to the first working node.

207. Adjust, according to the first average duration and the second average duration, a quantity of subtasks in the CPU task group on the first working node, or a quantity of subtasks in the GPU task group on the first working node.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

In addition, in this embodiment of the present disclosure, a quantity of subtasks executed by the CPU or the GPU may be dynamically adjusted according to an environment change and continuous running of a subtask. This avoids overload of the CPU or the GPU, so as to reduce system throughput.

It should be understood that after each subtask is executed, execution log information of the subtask needs to be recorded into the performance database. In 206, the performance database may be queried according to a specific period, for example, the performance database is queried once every ten minutes. Calculating load of the CPU and the GPU corresponding to the current working node is calculating average duration of executing subtasks by the CPU and the GPU. If the load is uneven, and a ratio exceeds a specific threshold, an allocation to the task groups is adjusted. That is, quantities of subtasks included in the three categories of task groups are adjusted.

Optionally, in another embodiment, in 207, if the first average duration is greater than the second average duration, first M subtasks that are in the to-be-determined task group on the first working node and that have greatest acceleration ratios are allocated to the GPU task group on the first working node, where the acceleration ratio is a ratio of a time of executing a subtask by the CPU to a time of executing the subtask by the GPU, or first N subtasks that are in the CPU task group on the first working node and that have greatest acceleration ratios are allocated to the to-be-determined task group on the first working node, where M and N are positive integers; or if the first average delay is less than the second average delay, first M subtasks that are in the to-be-determined task group on the first working node and that have smallest acceleration ratios are allocated to the CPU task group on the first working node, or first N subtasks that are in the GPU task group on the first working node and that have smallest acceleration ratios are allocated to the to-be-determined task group on the first working node.

Figure 6:
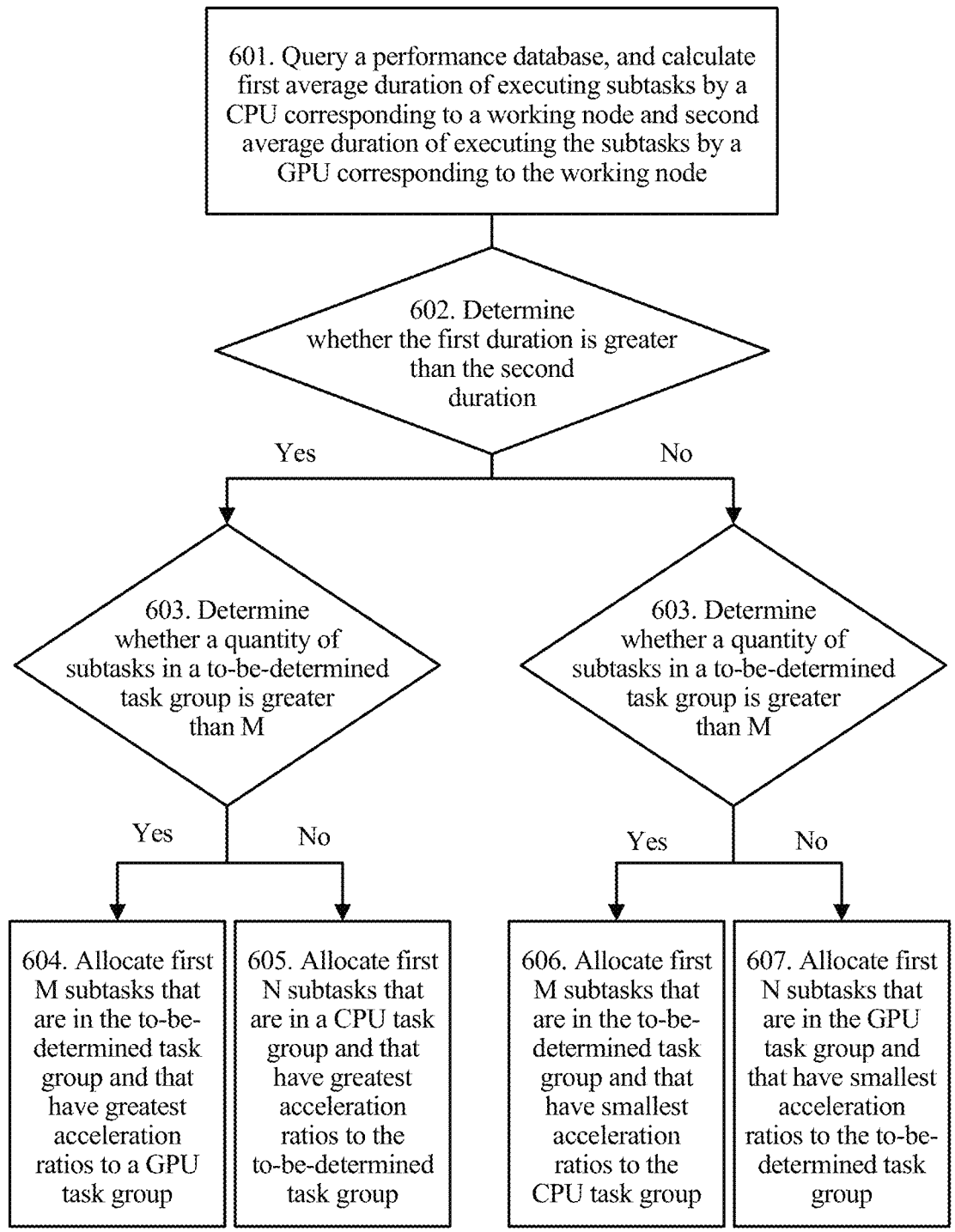
FIG. 6 is a schematic flowchart of a process of adjusting CPU or GPU load according to an embodiment of the present disclosure.

With reference to FIG. 6, the following describes in detail how to adjust CPU or GPU load. An adjustment method may be executed by a working node or any apparatus in FIG. 8 to FIG. 10. FIG. 6 is a schematic flowchart of a process of adjusting CPU or GPU load according to an embodiment of the present disclosure. The process may include:

601. Query a performance database, and calculate first average duration of executing subtasks by a CPU corresponding to a working node and second average duration of executing the subtasks by a GPU corresponding to the working node.

602. Determine whether the first duration is greater than the second duration.

603. Determine whether a quantity of subtasks in a to-be-determined task group is greater than M.

If in 602, the first duration is greater than the second duration, and in 603, the quantity of the subtasks in the to-be-determined task group is greater than M, perform 604; if in 602, the first duration is greater than the second duration, and in 603, the quantity of the subtasks in the to-be-determined task group is not greater than M, perform 605; if in 602, the first duration is not greater than the second duration, and in 603, the quantity of the subtasks in the to-be-determined task group is greater than M, perform 606; or if in 602, the first duration is not greater than the second duration, and in 603, the quantity of the subtasks in the to-be-determined task group is not greater than M, perform 607.

604. Allocate first M subtasks that are in the to-be-determined task group and that have greatest acceleration ratios to a GPU task group.

605. Allocate first N subtasks that are in a CPU task group and that have greatest acceleration ratios to the to-be-determined task group.

606. Allocate first M subtasks that are in the to-be-determined task group and that have smallest acceleration ratios to the CPU task group.

607. Allocate first N subtasks that are in the GPU task group and that have smallest acceleration ratios to the to-be-determined task group.

It should be understood that if the first duration is equal to the second duration, it indicates that load is balanced, and in this case, a quantity of CPU or GPU subtasks may not be adjusted.

Specifically, a first working node executes multiple subtasks in a specific period. Each subtask is corresponding to one execution duration. Average duration of the multiple subtasks may be estimated within the specific period. It should be understood that only the first working node is described herein, and for another working node, the same method is used.

When average duration of executing subtasks by a CPU corresponding to the first working node is greater than average duration of executing the subtasks by a GPU corresponding to the first working node, it indicates that the CPU is overloaded, and the first M subtasks that are in the to-be-determined task group and that have greatest acceleration ratios are moved to the GPU task group. Therefore, a quantity of subtasks scheduled to the CPU for execution may be reduced, so as to reduce CPU load. If a quantity of subtasks in the to-be-determined task group is insufficient, the first N subtasks that are in the CPU task group and that have greatest acceleration ratios are selected and moved to the to-be-determined task group.

Similarly, when the GPU is overloaded, the first M subtasks that are in the to-be-determined task group and that have smallest acceleration ratios may be moved to the CPU task group. If a quantity of subtasks in the to-be-determined task group is insufficient, the first N subtasks that are in the GPU task group and that have smallest acceleration ratios are selected and moved to the to-be-determined task group.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

In addition, in this embodiment of the present disclosure, a quantity of subtasks executed by the CPU or the GPU may be dynamically adjusted according to an environment change and continuous running of a subtask. This avoids overload of the CPU or the GPU, so as to reduce system throughput.

Figure 7:
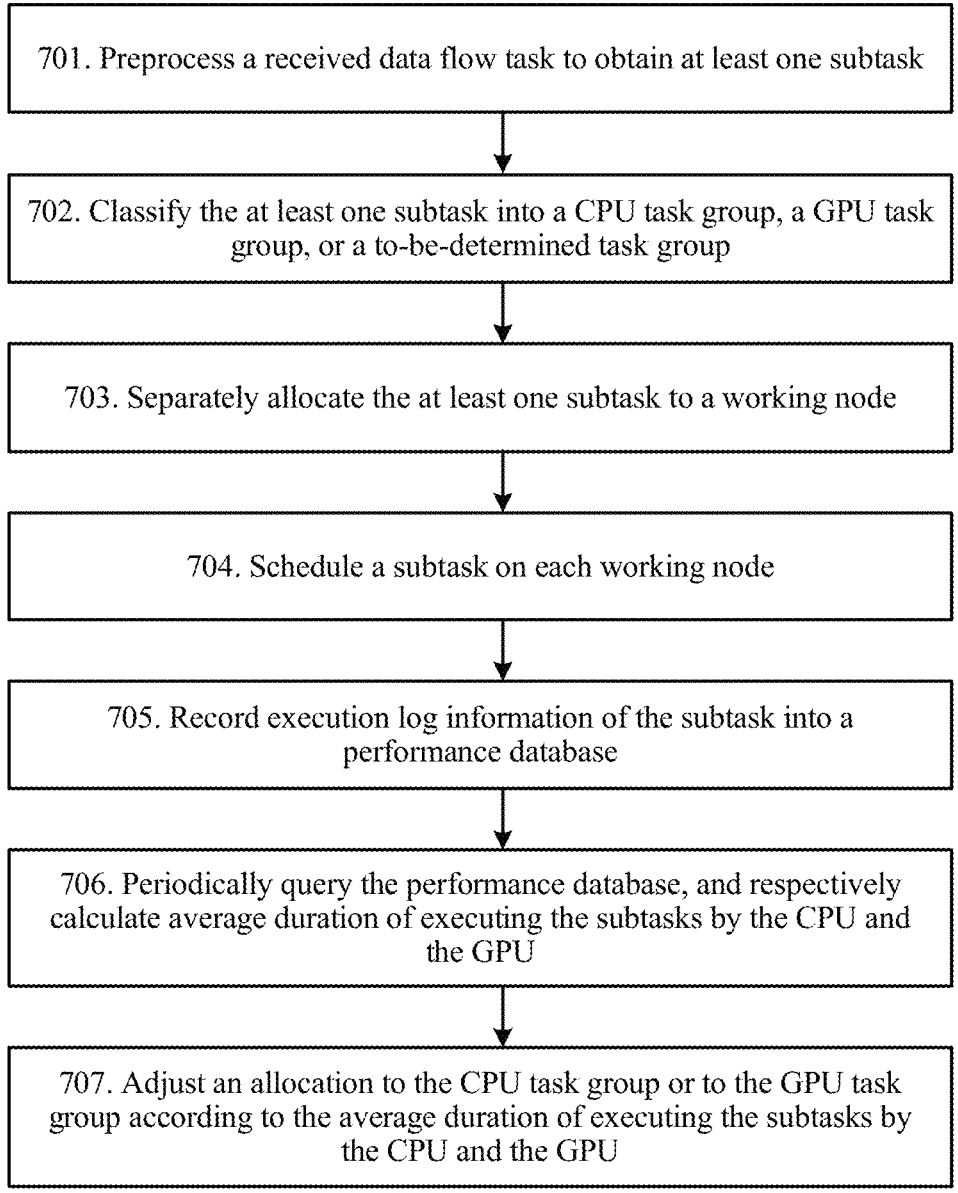
FIG. 7 is a schematic flowchart of a process of scheduling a data flow task according to an embodiment of the present disclosure.

FIG. 7 is a schematic flowchart of a process of scheduling a data flow task according to an embodiment of the present disclosure. The process may be executed by a working node or any apparatus in FIG. 8 to FIG. 10. A distributed heterogeneous system to which the process is applied includes at least one working node, and the process includes:

701. Preprocess a received data flow task to obtain at least one subtask.

The data flow task is sent by user equipment. Preprocessing the data flow task may include a processing process such as statement parsing, semantic analysis, query tree optimization, and subtask generation. A process included in the preprocessing may be an existing common method, and the method used in the preprocessing process is not limited in this embodiment of the present disclosure.

Each subtask in the generated at least one subtask may execute a specific operation. For example, a subtask may be corresponding to a filter operation, a subtask may be corresponding to a sorting operation, and a subtask may be corresponding to an aggregation operation. The multiple subtasks may be mutually connected according to a dependency of data in the multiple subtasks, to form an execution plan data structure such as an execution tree or a directed acyclic graph (DAG).

702. Classify the at least one subtask into a CPU task group, a GPU task group, or a to-be-determined task group.

This step may be executed according to the process shown in FIG. 4.

Specifically, a subtask in the CPU task group may be executed by the CPU, a subtask in the GPU task group may be executed by the GPU, and a subtask in the to-be-determined task group may be executed by the CPU or the GPU. A platform for executing the subtask in the to-be-determined task group may be dynamically adjusted such that execution costs are relatively low.

If a part of subtasks in the at least one subtask include a static characteristic, scheduling is preferentially performed according to an indication of the static characteristic. The static characteristic is used to indicate whether the subtask is executed by the CPU or is executed by the GPU. The static characteristic may include: a rigid specification on each subtask by a user in a program or file configuration, or through another means, a user code semantic characteristic, and the like. For example, for a filter operation subtask, the user specifies that this type of operation is scheduled to the CPU for execution. In this case, the operation may be implemented using @CPU in code, and the subtask is classified into the CPU task group. Therefore, the part of subtasks may be classified into the CPU task group or the GPU task group.

If a part of subtasks in the at least one subtask do not include the static characteristic, the part of subtasks are classified according to costs of executing the subtasks. Specifically, a cost calculation parameter of each subtask in the part of subtasks may be obtained, so as to approximately estimate costs of executing the subtask separately by the CPU and the GPU. A ratio of duration of executing the subtask by the CPU to duration of executing the subtask by the GPU is recorded as an acceleration ratio. If the acceleration ratio of the subtask is greater than the first preset threshold, it indicates that it is better to execute the subtask by the CPU, and the subtask is classified into the GPU task group; if the acceleration ratio of the subtask is less than the second preset threshold, it indicates that it is better to execute the subtask by the CPU, and the subtask is classified into the CPU task group; or if the acceleration ratio of the subtask is not greater than the first preset threshold or is not less than the second preset threshold, it indicates that there is no obvious difference to execute the subtask by the CPU and the GPU, and the subtask is classified into the to-be-determined task group. An execution platform is dynamically determined for the subtask in the to-be-determined task group according to an actual running status. Therefore, the part of subtasks may be classified into the CPU task group, the GPU task group, or the to-be-determined task group.

It should be understood that the first preset threshold may represent a degree to which the subtask being executed by the GPU is better than being executed by the CPU. The first preset threshold may be preset. The setting of the first preset threshold may be changed based on experience and an environment demand. Similarly, the second preset threshold may represent a degree to which the subtask being executed by the CPU is better than being executed by the GPU. The second preset threshold may be preset. The setting of the second preset threshold may be changed based on experience and an environment demand.

703. Separately allocate the at least one subtask to the working node.

Specifically, in the heterogeneous system, a computing resource is mainly a CPU, that is, the CPU computing resource is in the majority whereas a GPU resource is in the minority. When a subtask is allocated, a scarce resource allocated to each subtask is first considered. Therefore, in this embodiment of the present disclosure, scheduling may be performed according to a sequence in which the GPU task group is first allocated, then the to-be-determined task group, and finally the CPU task group.

Optionally, in an embodiment, in this embodiment of the present disclosure, statuses of an available CPU resource and an available GPU resource may be queried. According to the query result, at least one second working node having the available CPU resource and at least one third working node having the available GPU resource may be determined.

The at least one second working node is sorted in descending order according to an average remainder of the available GPU resource of the at least one second working node, and is recorded as GPU Nodes. The at least one third working node is sorted in descending order according to a quantity of the available CPU resource of the at least one third working node, and is recorded as CPU Nodes. The quantity of the available CPU resources may be indicated using a quantity of CPU interfaces (CPU Slot). For the working nodes in the GPU Nodes, a digit or another identifier may be used to indicate a sequence of allocating each working node.

Optionally, in another embodiment, a subtask in the GPU task group may be sequentially allocated to a working node in the GPU node group in a polling manner. That is, according to the sorting of the GPU node group, a working node in the front ranking is first selected. For example, an allocation sequence may be determined according to an identifier marked on each working node. After one subtask is allocated to a working node, a corresponding GPU resource is deducted from the current working node. Allocation of a next subtask starts from a next working node in a next GPU Nodes.

If the subtask requires more GPU resources than an available GPU resource on each working node in the current GPU Nodes, a working node that is in all working nodes in the GPU Nodes and that runs a largest quantity of tasks in the to-be-determined task group is selected for allocation.

Optionally, in another embodiment, when subtasks in the to-be-determined task group are allocated, the subtasks in the to-be-determined task group may be allocated to at least one second working node in descending order of priorities until all subtasks in the to-be-determined task group are allocated or there is no matched available GPU resource for allocation. Remaining unallocated subtasks are allocated to working nodes in the CPU Nodes in a polling manner. The polling allocation manner may be the same as the polling method in which the subtask in the GPU task group is allocated, and to avoid repetition, details are not described herein again.

Optionally, in another embodiment, the subtasks in the CPU task group may be allocated to working nodes in the GPU Nodes in a polling manner. The polling allocation manner may be the same as the polling method in which the subtask in the GPU task group is allocated, and to avoid repetition, details are not described herein again.

704. Schedule a subtask on each working node.

A method for scheduling the subtask on each working node may be shown in FIG. 3.

Specifically, if the subtask belongs to the CPU task group, the subtask is scheduled to the CPU corresponding to the working node at which the subtask is located, to be executed; if the subtask belongs to the GPU task group, the subtask is scheduled to the GPU corresponding to the working node at which the subtask is located, to be executed; or if the subtask belongs to the to-be-determined task group, according to costs of executing the subtask by the CPU and the GPU, the subtask is scheduled to the CPU or the GPU corresponding to the working node at which the subtask is located, to be executed. The cost of executing the subtask may be obtained by means of estimation.

It should be understood that if the cost of executing the subtask by the CPU is lower, the subtask is executed by the CPU; or if the cost of executing the subtask by the GPU is lower, the subtask is executed by the GPU. The cost may include duration of executing the subtask. The duration of executing the subtask may include a required waiting time before the subtask is executed and a running time of the subtask. Optionally, in another embodiment, the cost may also include an overhead of executing the subtask, such as an occupied resource.

705. Record execution log information of the subtask into a performance database.

It should be understood that after each subtask is executed, execution log information of the subtask needs to be recorded into the performance database. The execution log information includes a data volume of the first subtask, required waiting duration before the first subtask is executed, and a running platform and running duration of the first subtask, and the running platform is the CPU or the GPU.

706. Periodically query the performance database, and respectively calculate average duration of executing the subtasks by the CPU and the GPU.

The performance database may be queried according to a specific period, for example, the performance database is queried once every ten minutes. Calculating load of the CPU and the GPU corresponding to the current working node is calculating average duration of executing subtasks by the CPU and the GPU. If the load is uneven, and a ratio exceeds a specific threshold, an allocation to the task groups is adjusted. That is, quantities of subtasks included in the three categories of task groups are adjusted.

707. Adjust an allocation to the CPU task group or to the GPU task group according to the average duration of executing the subtasks by the CPU and the GPU.

If the average duration of executing the subtasks by the CPU is greater than the average duration of executing the subtasks by the GPU, when a quantity of the subtasks in the to-be-determined task group is greater than M, first M subtasks that are in the to-be-determined task group and that have greatest acceleration ratios are allocated to the GPU task group; or when the quantity of the subtasks in the to-be-determined task group is less than or equal to M, first N subtasks that are in the CPU task group and that have greatest acceleration ratios are allocated to the to-be-determined task group.

If the average duration of executing the subtasks by the GPU is greater than the average duration of executing the subtasks by the CPU, when a quantity of the subtasks in the to-be-determined task group is greater than M, first M subtasks that are in the to-be-determined task group and that have smallest acceleration ratios are allocated to the CPU task group; or when the quantity of the subtasks in the to-be-determined task group is less than or equal to M, first N subtasks that are in the GPU task group and that have smallest acceleration ratios are allocated to the to-be-determined task group.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

In addition, in this embodiment of the present disclosure, a quantity of subtasks executed by the CPU or the GPU may be dynamically adjusted according to an environment change and continuous running of a subtask. This avoids overload of the CPU or the GPU, so as to reduce system throughput.

Figure 8:
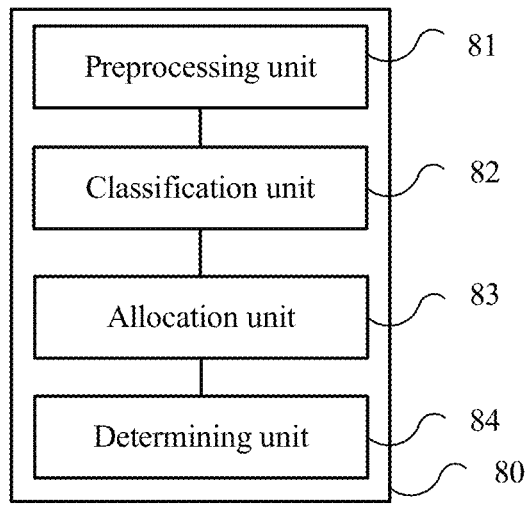
FIG. 8 is a schematic block diagram of an apparatus according to an embodiment of the present disclosure.

FIG. 8 is a schematic block diagram of an apparatus according to an embodiment of the present disclosure. An apparatus 80 in FIG. 8 may implement the method and the process involved in FIG. 1 to FIG. 7. To avoid repetition, details are not described herein again. A distributed heterogeneous system to which the apparatus 80 is applied includes at least one working node, and the apparatus 80 may include:

a preprocessing unit 81, configured to preprocess a data flow task to obtain at least one subtask;

a classification unit 82, configured to classify a first subtask in the at least one subtask into a central processing unit CPU task group, a graphics processing unit GPU task group, or a to-be-determined task group;

an allocation unit 83, configured to allocate the first subtask to a first working node in the at least one working node according to the task group to which the first subtask belongs and a resource status of the at least one working node; and a determining unit 84, configured to: when the first subtask belongs to the CPU task group, determine that a CPU corresponding to the first working node executes the first subtask; when the first subtask belongs to the GPU task group, determine that a GPU corresponding to the first working node executes the first subtask; or when the first subtask belongs to the to-be-determined task group, determine, according to costs of executing the first subtask by a CPU and a GPU, that the CPU or the GPU corresponding to the first working node executes the first subtask, where the cost includes duration of executing the subtask.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

It should be understood that the preprocessing unit 81, the classification unit 82, and the allocation unit 83 are global modules, that is, one preprocessing unit 81, one classification unit 82, and one allocation unit 83 may be separately included in the apparatus 80. The distributed heterogeneous system may include at least one working node, and each working node may include the determining unit 84. That is, a quantity of the determining units 84 included in the apparatus 80 is equal to a quantity of the working nodes.

Optionally, in another embodiment, the classification unit 82 may be configured to: when the first subtask includes indication information, and the indication information indicates that the first subtask is executed by the CPU, classify the first subtask into the CPU task group; when the first subtask includes indication information, and the indication information indicates that the first subtask is executed by the GPU, classify the first subtask into the GPU task group; or when the first subtask does not include indication information, estimate first duration of executing the first subtask by the CPU and second duration of executing the first subtask by the GPU, and classify the first subtask into the CPU task group, the GPU task group, or the to-be-determined task group according to the first duration and the second duration.

Optionally, in another embodiment, if a radio of the first duration to the second duration is less than a first preset threshold, the classification unit 82 may classify the first subtask into the CPU task group; if a radio of the first duration to the second duration is greater than a second preset threshold, the classification unit 82 may classify the first subtask into the GPU task group; or if a radio of the first duration to the second duration is not less than the first preset threshold or is not greater than the second preset threshold, the classification unit 82 may classify the first subtask into the to-be-determined task group.

Optionally, in another embodiment, the allocation unit 83 may determine a first working node group that is in the at least one working node and that includes an available CPU resource, and a second working node group that is in the at least one working node and that includes an available GPU resource. Nodes in the first working node group are sorted according to a remainder of the available CPU resource; and nodes in the second working node group are sorted according to a remainder of the available GPU resource. According to the task group to which the first subtask belongs, the first subtask is allocated to the first working node in the first working node group according to sorting of the first working node group; or the first subtask is allocated to the first working node in the second working node group according to sorting of the second working node group.

It should be understood that a CPU/GPU resource management module records configuration statuses of CPU and GPU resources and usage statuses of the CPU and GPU resources on each working node. The allocation unit 83 may obtain an available CPU resource and an available GPU resource on each working node from the CPU/GPU resource management module.

Figure 9:
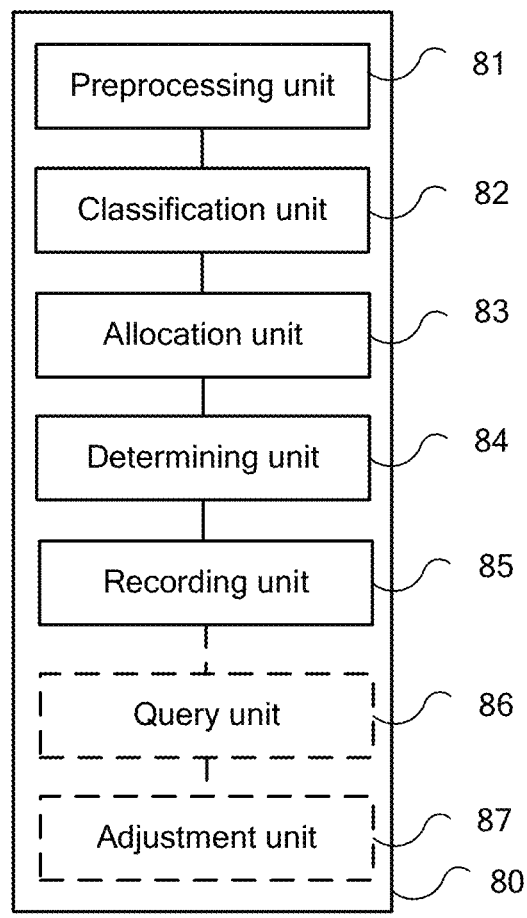
FIG. 9 is a schematic block diagram of an apparatus according to another embodiment of the present disclosure.

FIG. 9 is a schematic block diagram of an apparatus according to another embodiment of the present disclosure. Optionally, in another embodiment, the apparatus 80 further includes:

a recording unit 85, configured to record execution log information of the first subtask into a performance database, where the execution log information includes a data volume of the first subtask, required waiting duration before the first subtask is executed, and a running platform and running duration of the first subtask, and the running platform is the CPU or the GPU.

Optionally, in another embodiment, the apparatus 80 further includes:

a query unit 86, configured to: query the performance database, and calculate first average duration of executing subtasks by the CPU corresponding to the first working node and second average duration of executing the subtasks by the GPU corresponding to the first working node; and an adjustment unit 87, configured to adjust, according to the first average duration and the second average duration, a quantity of subtasks in the CPU task group on the first working node, or a quantity of subtasks in the GPU task group on the first working node.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

In addition, in this embodiment of the present disclosure, a quantity of subtasks executed by the CPU or the GPU may be dynamically adjusted according to an environment change and continuous running of a subtask. This avoids overload of the CPU or the GPU, so as to reduce system throughput.

Optionally, in another embodiment, if the first average duration is greater than the second average duration, the adjustment unit 87 may allocate first M subtasks that are in the to-be-determined task group on the first working node and that have greatest acceleration ratios to the GPU task group on the first working node, where the acceleration ratio is a ratio of a time of executing a subtask by the CPU to a time of executing the subtask by the GPU, or may allocate first N subtasks that are in the CPU task group on the first working node and that have greatest acceleration ratios to the to-be-determined task group on the first working node, where M and N are positive integers; or if the first average delay is less than the second average delay, the adjustment unit 87 may allocate first M subtasks that are in the to-be-determined task group on the first working node and that have smallest acceleration ratios to the CPU task group on the first working node, or may allocate first N subtasks that are in the GPU task group on the first working node and that have smallest acceleration ratios to the to-be-determined task group on the first working node.

Figure 10:
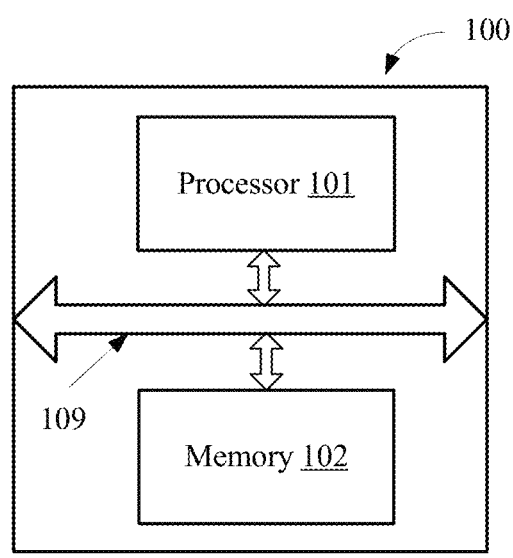
FIG. 10 is a schematic block diagram of an apparatus according to still another embodiment of the present disclosure.

FIG. 10 is a schematic block diagram of an apparatus according to another embodiment of the present disclosure.

An apparatus 100 in FIG. 10 may be configured to implement all steps and methods in the foregoing method embodiments. A distributed heterogeneous system to which the apparatus 100 is applied includes at least one working node. The apparatus 100 in FIG. 10 includes a processor 101 and a memory 102. The processor 101 and the memory 102 are connected using a bus system 109.

The processor 101 controls an operation of the apparatus 100. The memory 102 may include a read-only memory and a random access memory, and may provide an instruction and data for the processor 101. Apart of the memory 102 may further include a nonvolatile random access memory (NVRAM). All components of the apparatus 100 are coupled together using the bus system 109, and in addition to a data bus, the bus system 109 further includes a power bus, a control bus, and a status signal bus. However, for clarity of description, various buses are marked as the bus system 109 in the figure.

The processor 101 may be an integrated circuit chip and has a signal processing capability. The foregoing processor 101 may be a general purpose processor, a digital signal processor (DSP), an application-specific integrated circuit (ASIC), a field programmable gate array (FPGA) or another programmable logic device, a discrete gate or transistor logic device, or a discrete hardware assembly, and may implement or execute the methods, the steps, and the logical block diagrams disclosed in the embodiments of the present disclosure. The general purpose processor may be a microprocessor, or the processor may be any conventional processor or the like. The processor 101 reads information from the memory 102, and controls all parts of the apparatus 100 with reference to hardware of the processor.

The apparatus 100 in FIG. 10 may implement the method and the process involved in FIG. 2 to FIG. 7. To avoid repetition, details are not described again.

Specifically, under control of the processor 101, the apparatus 100 completes the following operations:

preprocessing the data flow task to obtain at least one subtask;

classifying a first subtask in the at least one subtask into a central processing unit CPU task group, a graphics processing unit GPU task group, or a to-be-determined task group;

allocating the first subtask to a first working node in the at least one working node according to the task group to which the first subtask belongs and a resource status of the at least one working node; and when the first subtask belongs to the CPU task group, determining that a CPU corresponding to the first working node executes the first subtask; when the first subtask belongs to the GPU task group, determining that a GPU corresponding to the first working node executes the first subtask; or when the first subtask belongs to the to-be-determined task group, determining, according to costs of executing the first subtask by a CPU and a GPU, that the CPU or the GPU corresponding to the first working node executes the first subtask, where the cost includes duration of executing the subtask.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

Optionally, in another embodiment, the processor 101 may be configured to: when the first subtask includes indication information, and the indication information indicates that the first subtask is executed by the CPU, classify the first subtask into the CPU task group; when the first subtask includes indication information, and the indication information indicates that the first subtask is executed by the GPU, classify the first subtask into the GPU task group; or when the first subtask does not include indication information, estimate first duration of executing the first subtask by the CPU and second duration of executing the first subtask by the GPU, and classify the first subtask into the CPU task group, the GPU task group, or the to-be-determined task group according to the first duration and the second duration.

Optionally, in another embodiment, if a radio of the first duration to the second duration is less than a first preset threshold, the processor 101 may classify the first subtask into the CPU task group; if a radio of the first duration to the second duration is greater than a second preset threshold, the processor 101 may classify the first subtask into the GPU task group; or if a radio of the first duration to the second duration is not less than the first preset threshold or is not greater than the second preset threshold, the processor 101 may classify the first subtask into the to-be-determined task group.

Optionally, in another embodiment, the processor 101 may determine a first working node group that is in the at least one working node and that includes an available CPU resource, and a second working node group that is in the at least one working node and that includes an available GPU resource. Nodes in the first working node group are sorted according to a remainder of the available CPU resource; and nodes in the second working node group are sorted according to a remainder of the available GPU resource. According to the task group to which the first subtask belongs, the first subtask is allocated to the first working node in the first working node group according to sorting of the first working node group; or the first subtask is allocated to the first working node in the second working node group according to sorting of the second working node group.

Optionally, in another embodiment, the processor 101 may further record execution log information of the first subtask into a performance database, where the execution log information includes a data volume of the first subtask, required waiting duration before the first subtask is executed, and a running platform and running duration of the first subtask, and the running platform is the CPU or the GPU.

Optionally, in another embodiment, the processor 101 may further query the performance database, and calculate first average duration of executing subtasks by the CPU corresponding to the first working node, and second average duration of executing the subtasks by the GPU corresponding to the first working node; and adjust, according to the first average duration and the second average duration, a quantity of subtasks in the CPU task group on the first working node, or a quantity of subtasks in the GPU task group on the first working node.

Optionally, in another embodiment, if the first average duration is greater than the second average duration, the processor 101 may allocate first M subtasks that are in the to-be-determined task group on the first working node and that have greatest acceleration ratios to the GPU task group on the first working node, where the acceleration ratio is a ratio of a time of executing a subtask by the CPU to a time of executing the subtask by the GPU, or may allocate first N subtasks that are in the CPU task group on the first working node and that have greatest acceleration ratios to the to-be-determined task group on the first working node, where M and N are positive integers; or if the first average delay is less than the second average delay, the processor 101 may allocate first M subtasks that are in the to-be-determined task group on the first working node and that have smallest acceleration ratios to the CPU task group on the first working node, or may allocate first N subtasks that are in the GPU task group on the first working node and that have smallest acceleration ratios to the to-be-determined task group on the first working node.

In this embodiment of the present disclosure, a subtask of a data flow task is statically allocated, so as to determine a category of the subtask, and the subtask is dynamically scheduled using different scheduling methods and according to different categories. In this method, static allocation and dynamic scheduling are combined, and overheads of executing each subtask do not need to be calculated during dynamic scheduling, thereby reducing scheduling costs and further reducing a delay of scheduling a data flow task.

In addition, in this embodiment of the present disclosure, a quantity of subtasks executed by the CPU or the GPU may be dynamically adjusted according to an environment change and continuous running of a subtask. This avoids overload of the CPU or the GPU, so as to reduce system throughput.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely an example of embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A method for scheduling a data flow task in a distributed heterogeneous system comprising at least one working node, the method comprising:
   preprocessing the data flow task to obtain at least one subtask;
   classifying a first subtask in the at least one subtask into a task group, wherein task groups of the distributed heterogeneous system comprise a central processing unit (CPU) task group, a graphics processing unit (GPU) task group, and a to-be-determined task group, wherein classifying a first subtask in the at least one subtask into a task group comprises:
   classifying the first subtask into the CPU task group when the first subtask comprises indication information indicating that the first subtask is executed by a CPU; and
   classifying the first subtask into the GPU task group when the first subtask comprises indication information indicating that the first subtask is executed by a GPU;
   allocating the first subtask to a first working node in the at least one working node according to the task group to which the first subtask belongs and a resource status of the at least one working node;
   determining that a CPU corresponding to the first working node executes the first subtask when the first subtask belongs to the CPU task group;
   determining that a GPU corresponding to the first working node executes the first subtask when the first subtask belongs to the GPU task group; and
   determining, according to costs of executing the first subtask by a CPU and a GPU, a running platform that executes the first subtask when the first subtask belongs to the to-be-determined task group, wherein each of the costs comprises duration of executing the first subtask.

2. The method according to claim 1, wherein classifying a first subtask in the at least one subtask into a task group comprises:
   estimating first duration of executing the first subtask by the CPU and second duration of executing the first subtask by the GPU when the first subtask does not comprise indication information, and classifying the first subtask into a task group according to the first duration and the second duration.

3. The method according to claim 2, wherein classifying the first subtask into a task group according to the first duration and the second duration comprises:
   classifying the first subtask into the CPU task group if a ratio of the first duration to the second duration is less than a first preset threshold;
   classifying the first subtask into the GPU task group if the ratio of the first duration to the second duration is greater than a second preset threshold; and
   classifying the first subtask into the to-be-determined task group if the ratio of the first duration to the second duration is not less than the first preset threshold and is not greater than the second preset threshold.

4. The method according to claim 1, further comprising:
recording execution log information of the first subtask into a performance database, wherein the execution log information comprises a data volume of the first subtask, required waiting duration before the first subtask is executed, and a running platform and running duration of the first subtask.

5. The method according to claim 4, further comprising:
querying the performance database, and calculating first average duration of executing subtasks by the CPU corresponding to the first working node and second average duration of executing the subtasks by the GPU corresponding to the first working node; and
adjusting, according to the first average duration and the second average duration, subtasks distribution on the first working node.

6. A method for scheduling a data flow task in a distributed heterogeneous system comprising at least one working node, the method comprising:
preprocessing the data flow task to obtain at least one subtask;
classifying a first subtask in the at least one subtask into a task group, wherein task groups of the distributed heterogeneous system comprise a central processing unit (CPU) task group, a graphics processing unit (GPU) task group, and a to-be-determined task group;
allocating the first subtask to a first working node in the at least one working node according to the task group to which the first subtask belongs and a resource status of the at least one working node;
determining that a CPU corresponding to the first working node executes the first subtask when the first subtask belongs to the CPU task group;
determining that a GPU corresponding to the first working node executes the first subtask when the first subtask belongs to the GPU task group;
determining, according to costs of executing the first subtask by a CPU and a GPU, a running platform that executes the first subtask when the first subtask belongs to the to-be-determined task group, wherein each of the costs comprises duration of executing the subtask;
calculating first average duration of executing subtasks by the CPU corresponding to the first working node and second average duration of executing the subtasks by the GPU corresponding to the first working node; and
adjusting, according to the first average duration and the second average duration, subtasks distribution on the first working node;
wherein adjusting, according to the first average duration and the second average duration, subtasks distribution on the first working node comprises:
allocating first O subtasks that are in the to-be-determined task group on the first working node and that have greatest acceleration ratios to the GPU task group on the first working node if the first average duration is greater than the second average duration, wherein the acceleration ratio is a ratio of a time of executing a subtask by the CPU to a time of executing the subtask by the GPU; and
allocating first P subtasks that are in the to-be-determined task group on the first working node and that have smallest acceleration ratios to the CPU task group on the first working node if the first average duration is less than the second average duration, wherein O and P are positive integers.

7. The method according to claim 5, wherein adjusting, according to the first average duration and the second average duration, subtasks distribution on the first working node comprises:
allocating first O subtasks that are in the CPU task group on the first working node and that have greatest acceleration ratios to the to-be-determined task group on the first working node if the first average duration is greater than the second average duration, wherein the acceleration ratio is a ratio of a time of executing a subtask by the CPU to a time of executing the subtask by the GPU; and
allocating first P subtasks that are in the GPU task group on the first working node and that have smallest acceleration ratios to the to-be-determined task group on the first working node if the first average duration is less than the second average duration, wherein O and P are positive integers.

8. An apparatus for use in a distributed heterogeneous system comprising at least one working node, the apparatus comprising:
a memory configured to store instructions; and
a processor coupled to the memory and configured to execute the instructions to:
preprocess a data flow task to obtain at least one subtask;
classify a first subtask in the at least one subtask into a task group, wherein task groups of the distributed heterogeneous system comprise a central processing unit (CPU) task group, a graphics processing unit (GPU) task group, and a to-be-determined task group, wherein to classify a first subtask in the at least one subtask into a task group comprises:
classify the first subtask into the CPU task group when the first subtask comprises indication information indicating that the first subtask is executed by a CPU; and
classify the first subtask into the GPU task group when the first subtask comprises indication information indicating that the first subtask is executed by a GPU:
allocate the first subtask to a first working node in the at least one working node according to the task group to which the first subtask belongs and a resource status of the at least one working node;
determine that a CPU corresponding to the first working node executes the first subtask when the first subtask belongs to the CPU task group;
determine that a GPU corresponding to the first working node executes the first subtask when the first subtask belongs to the GPU task group; and
determine, according to costs of executing the first subtask by a CPU and a GPU, a running platform that executes the first subtask when the first subtask belongs to the to-be-determined task group, wherein each of the costs comprises duration of executing the first subtask.

9. The apparatus according to claim 8, wherein the processor is configured to:
estimate first duration of executing the first subtask by the CPU and second duration of executing the first subtask by the GPU when the first subtask does not comprise indication information, and classify the first subtask into a task group according to the first duration and the second duration.

10. The apparatus according to claim 8, wherein the processor is configured to:

classify the first subtask into the CPU task group if a ratio of the first duration to the second duration is less than a first preset threshold;

classify the first subtask into the GPU task group if the ratio of the first duration to the second duration is greater than a second preset threshold; and classify the first subtask into the to-be-determined task group if the ratio of the first duration to the second duration is not less than the first preset threshold and is not greater than the second preset threshold.

11. The apparatus according to claim 8, wherein the processor is further configured to:

record execution log information of the first subtask into a performance database, wherein the execution log information comprises a data volume of the first subtask, required waiting duration before the first subtask is executed, and a running platform and running duration of the first subtask.

12. The apparatus according to claim 11, wherein the processor is further configured to:

query the performance database, and calculate first average duration of executing subtasks by the CPU corresponding to the first working node and second average duration of executing the subtasks by the GPU corresponding to the first working node; and adjust, according to the first average duration and the second average duration, subtasks distribution on the first working node.

13. An apparatus for use in a distributed heterogeneous system comprising at least one working node, the apparatus comprising:

a memory configured to store instructions; and a processor coupled to the memory and configured to execute the instructions to:

preprocess a data flow task to obtain at least one subtask;

classify a first subtask in the at least one subtask into a task group, wherein task groups of the distributed heterogeneous system comprise a central processing unit (CPU) task group, a graphics processing unit (GPU) task group, and a to-be-determined task group;

allocate the first subtask to a first working node in the at least one working node according to the task group to which the first subtask belongs and a resource status of the at least one working node;

determine that a CPU corresponding to the first working node executes the first subtask when the first subtask belongs to the CPU task group;

determine that a GPU corresponding to the first working node executes the first subtask when the first subtask belongs to the GPU task group;

determine, according to costs of executing the first subtask by a CPU and a GPU, a running platform that executes the first subtask when the first subtask belongs to the to-be-determined task group, wherein each of the costs comprises duration of executing the subtask, calculate first average duration of executing subtasks by the CPU corresponding to the first working node and second average duration of executing the subtasks by the GPU corresponding to the first working node;

adjust, according to the first average duration and the second average duration, subtasks distribution on the first working node;

allocate first O subtasks that are in the to-be-determined task group on the first working node and that have greatest acceleration ratios to the GPU task group on the first working node if the first average duration is greater than the second average duration, wherein the acceleration ratio is a ratio of a time of executing a subtask by the CPU to a time of executing the subtask by the GPU; and allocate first P subtasks that are in the to-be-determined task group on the first working node and that have smallest acceleration ratios to the CPU task group on the first working node if the first average duration is less than the second average duration, wherein O and P are positive integers.

14. The apparatus according to claim 12, wherein the processor is configured to:

allocate first O subtasks that are in the CPU task group on the first working node and that have greatest acceleration ratios to the to-be-determined task group on the first working node if the first average duration is greater than the second average duration, wherein the acceleration ratio is a ratio of a time of executing a subtask by the CPU to a time of executing the subtask by the GPU; and allocate first P subtasks that are in the GPU task group on the first working node and that have smallest acceleration ratios to the to-be-determined task group on the first working node if the first average duration is less than the second average duration, wherein O and P are positive integers.

15. A distributed heterogeneous system, comprising:

at least one working node; and a scheduling apparatus configured to:

preprocess a data flow task to obtain at least one subtask, classify a first subtask in the at least one subtask into a task group, wherein task groups of the distributed heterogeneous system comprise a central processing unit (CPU) task group, a graphics processing unit (GPU) task group, and a to-be-determined task group, wherein to classify a first subtask in the at least one subtask into a task group comprises:

classify the first subtask into the CPU task group when the first subtask comprises indication information indicating that the first subtask is executed by a CPU; and classify the first subtask into the GPU task group when the first subtask comprises indication information indicating that the first subtask is executed by a GPU;

allocate the first subtask to a first working node in the at least one working node according to the task group to which the first subtask belongs and a resource status of the at least one working node, and determine that a CPU corresponding to the first working node executes the first subtask when the first subtask belongs to the CPU task group; determine that a GPU corresponding to the first working node executes the first subtask when the first subtask belongs to the GPU task group; and determine, according to costs of executing the first subtask by a CPU and a GPU, a running platform that executes the first subtask when the first subtask belongs to the to-be-determined task group, wherein each of the costs comprises duration of executing the first subtask.

16. The system according to claim 15, wherein the scheduling apparatus is configured to:
- estimate first duration of executing the first subtask by the CPU and second duration of executing the first subtask by the GPU when the first subtask does not comprise indication information, and classify the first subtask into a task group according to the first duration and the second duration.

17. The system according to claim 15, wherein the scheduling apparatus is configured to:
- classify the first subtask into the CPU task group if a ratio of the first duration to the second duration is less than a first preset threshold;
- classify the first subtask into the GPU task group if the ratio of the first duration to the second duration is greater than a second preset threshold; and
- classify the first subtask into the to-be-determined task group if the ratio of the first duration to the second duration is not less than the first preset threshold and is not greater than the second preset threshold.

18. The system according to claim 15, wherein the scheduling apparatus is further configured to:
- record execution log information of the first subtask into a performance database, wherein the execution log information comprises a data volume of the first subtask, required waiting duration before the first subtask is executed, and a running platform and running duration of the first subtask.

19. The system according to claim 18, wherein the scheduling apparatus is further configured to:
- query the performance database, and calculate first average duration of executing subtasks by the CPU corresponding to the first working node and second average duration of executing the subtasks by the GPU corresponding to the first working node; and
- adjust, according to the first average duration and the second average duration, subtasks distribution on the first working node.

20. A distributed heterogeneous system, comprising:
at least one working node, and
a scheduling apparatus configured to:
- preprocess a data flow task to obtain at least one subtask;
- classify a first subtask in the at least one subtask into a task group, wherein task groups of the distributed heterogeneous system comprise a central processing unit (CPU) task group, a graphics processing unit (GPU) task group, and a to-be-determined task group;
- allocate the first subtask to a first working node in the at least one working node according to the task group to which the first subtask belongs and a resource status of the at least one working node;
- determine that a CPU corresponding to the first working node executes the first subtask when the first subtask belongs to the CPU task group;
- determine that a GPU corresponding to the first working node executes the first subtask when the first subtask belongs to the GPU task group;
- determine, according to costs of executing the first subtask by a CPU and a GPU, a running platform that executes the first subtask when the first subtask belongs to the to-be-determined task group, wherein each of the costs comprises duration of executing the subtask;
- calculate first average duration of executing subtasks by the CPU corresponding to the first working node and second average duration of executing the subtasks by the GPU corresponding to the first working node;
- adjust, according to the first average duration and the second average duration, subtasks distribution on the first working node;
- allocate first O subtasks that are in the to-be-determined task group on the first working node and that have greatest acceleration ratios to the GPU task group on the first working node if the first average duration is greater than the second average duration, wherein the acceleration ratio is a ratio of a time of executing a subtask by the CPU to a time of executing the subtask by the GPU; and
- allocate first P subtasks that are in the to-be-determined task group on the first working node and that have smallest acceleration ratios to the CPU task group on the first working node if the first average duration is less than the second average duration, wherein O and P are positive integers.

* * * * *